United States Patent
Ke et al.

(10) Patent No.: US 9,077,176 B2
(45) Date of Patent: Jul. 7, 2015

(54) FLYBACK-BASED POWER CONVERSION APPARATUS AND POWER CONVERSION METHOD THEREOF

(71) Applicant: Power Forest Technology Corporation, Hsinchu (TW)

(72) Inventors: Po-Jen Ke, Taoyuan County (TW); Yun-Chi Chiang, Hsinchu County (TW); Tso-Min Chen, Hsinchu (TW)

(73) Assignee: Power Forest Technology Corporation, Hsinchu County (TW)

( * ) Notice: Subject to any disclaimer, the term of this patent is extended or adjusted under 35 U.S.C. 154(b) by 152 days.

(21) Appl. No.: 13/845,099

(22) Filed: Mar. 18, 2013

(65) Prior Publication Data
US 2014/0016378 A1    Jan. 16, 2014

(30) Foreign Application Priority Data
Jul. 13, 2012  (TW) .............................. 101125362 A

(51) Int. Cl.
*H02M 3/335* (2006.01)
*H02H 7/12* (2006.01)
(Continued)

(52) U.S. Cl.
CPC ........ *H02H 7/1213* (2013.01); *H02M 3/33507* (2013.01); *H02H 7/122* (2013.01); *H02M 1/32* (2013.01); *H02M 3/33523* (2013.01); *H02M 2001/0022* (2013.01); *H02M 2001/327* (2013.01)

(58) Field of Classification Search
CPC . H02H 7/1213; H02H 7/122; H02M 3/33507; H02M 1/32

USPC .............. 363/21.18, 21.01, 21.12, 21.17, 50
See application file for complete search history.

(56) References Cited

U.S. PATENT DOCUMENTS

| 7,504,815 B2 | 3/2009 | Moyse et al. |
| 7,635,956 B2 | 12/2009 | Huynh et al. |

(Continued)

FOREIGN PATENT DOCUMENTS

| CN | 2930191 | 8/2007 |
| CN | 101872985 | 10/2010 |

(Continued)

OTHER PUBLICATIONS

"Office Action of Taiwan Counterpart Application", issued on Sep. 9, 2014, p. 1-p. 7.

*Primary Examiner* — Timothy J Dole
*Assistant Examiner* — Htet Kyaw
(74) *Attorney, Agent, or Firm* — Jianq Chyun IP Office

(57) ABSTRACT

A flyback-based power conversion apparatus and a power conversion method thereof are provided. By switching first and second detection switches disposed in a control chip and coupled to a multi-function pin of the control chip at different timings, the present invention applies a collocation of a voltage-current detection auxiliary circuit and a current detection circuit at a certain timing to execute a detection of the AC input voltage received by a flyback power conversion circuit, and the present invention applies a collocation of the auxiliary voltage-current detection circuit, an over temperature protection unit and an over voltage protection unit at another timing to execute detections of an over temperature protection and an over voltage protection. As the result, a single multi-function detection pin of the control pin is corresponding to a plurality of related function detections, so as to reduce the production cost of manufacturing the control chip.

15 Claims, 6 Drawing Sheets

(51) Int. Cl.
*H02M 1/32* (2007.01)
*H02H 7/122* (2006.01)
*H02M 1/00* (2007.01)

(56) References Cited

U.S. PATENT DOCUMENTS

| | | | |
|---|---|---|---|
| 7,978,487 | B2 | 7/2011 | Lin |
| 8,649,129 | B2 * | 2/2014 | Huang ............................. 361/18 |
| 8,670,248 | B2 * | 3/2014 | Yang ......................... 363/21.16 |
| 2006/0291258 | A1 * | 12/2006 | Zhu et al. ................... 363/21.12 |
| 2010/0315846 | A1 * | 12/2010 | Lin ................................. 363/50 |
| 2013/0003421 | A1 * | 1/2013 | Fang .......................... 363/21.01 |
| 2013/0121044 | A1 * | 5/2013 | Gao et al. ........................ 363/50 |

FOREIGN PATENT DOCUMENTS

| | | |
|---|---|---|
| CN | 202004651 | 10/2011 |
| TW | 200737638 | 10/2007 |
| TW | M387285 | 8/2010 |
| TW | 201101656 | 1/2011 |
| TW | 201143247 | 12/2011 |
| TW | 201213178 | 4/2012 |

* cited by examiner

FLYBACK-BASED POWER CONVERSION APPARATUS AND POWER CONVERSION METHOD THEREOF

CROSS-REFERENCE TO RELATED APPLICATION

This application claims the priority benefit of Taiwan application serial no. 101125362, filed on Jul. 13, 2012. The entirety of the above-mentioned patent application is hereby incorporated by reference herein and made a part of this specification.

BACKGROUND OF THE INVENTION

1. Field of the Invention

The present invention relates to a power conversion technique, and more particularly, to a flyback-based power conversion apparatus and a power conversion method thereof.

2. Description of Related Art

The primary purpose of applying a power conversion apparatus is to convert an unstable and high alternating current (AC) input voltage supplied by the power company to a stable and low direct current (DC) output voltage suitable for various electronic devices. Therefore, the power conversion apparatus is widely used in computers, office automatic facilities, industrial control equipments, communication apparatuses and so on.

Pulse width modulation (PWM) control chip is applied in most of the control structures of recent power conversion apparatuses. To protect the power conversion apparatus from being damaged because of over temperature (OT), over voltage (OV) and over current (OC), the pulse width modulation (PWM) control chip usually has a plurality of isolated detection pins for respectively executing the detections of over temperature protection (OTP), over voltage protection (OVP), over current protection (OCP) and alternating current (AC) input voltage received by the power conversion apparatus. In other words, each of the detection pins is only corresponding to one type of function detections. Therefore, applying various function detections by the pulse width modulation (PWM) control chip also means to increase the production cost of manufacturing the pulse width modulation (PWM) control chip.

SUMMARY OF THE INVENTION

Based on the previous description, the present invention is directed to a flyback-based power conversion apparatus and a power conversion method thereof in order to solve the problems mentioned in the related art.

An exemplary embodiment of the present invention provides a power conversion apparatus including a flyback power conversion circuit, a control chip and a voltage-current detection auxiliary circuit. The flyback power conversion circuit is configured to receive an alternating current (AC) input voltage and convert the alternating current (AC) input voltage in response to a pulse width modulation (PWM) signal so as to generate and provide a direct current (DC) output voltage. The control chip is coupled to the flyback power conversion circuit, and is configured to generate the pulse width modulation (PWM) signal in order to control an operation of the flyback power conversion circuit in response to a power supply requirement. The voltage-current detection auxiliary circuit is coupled to the flyback power conversion circuit and a multi-function detection pin of the control chip, configured to assist the control chip for executing a detection of the alternating current (AC) input voltage through the multi-function detection pin in a first detection phase and configured to assist the control chip for executing detections of an over temperature protection and an over voltage protection through the multi-function detection pin in a second detection phase.

In one exemplary embodiment of the present invention, the flyback power conversion circuit includes a transformer, a power switch, a first resistor, a first diode, a capacitor and a second diode. The transformer includes a primary winding, a secondary winding and an auxiliary winding, wherein a common polarity terminal of the primary winding of the transformer is configured to receive the alternating current (AC) input voltage, a common polarity terminal of the secondary winding of the transformer is coupled to a safety ground, and a common polarity terminal of the auxiliary winding of the transformer is coupled to a dangerous ground. A first terminal of the power switch is coupled to an opposite polarity terminal of the primary winding of the transformer, and a control terminal of the power switch is configured to receive the pulse width modulation (PWM) signal. A first terminal of the first resistor is coupled to a second terminal of the power switch and configured to provide an over current protection detection voltage (OCP detection voltage) to the control chip, and a second terminal of the first resistor is coupled to the dangerous ground. An anode of the first diode is coupled to an opposite polarity terminal of the secondary winding of the transformer, and a cathode of the first diode is configured to generate the DC output voltage. A first terminal of the capacitor is coupled to the cathode of the first diode, and a second terminal of the capacitor is coupled to the safety ground. An anode of the second diode is coupled to an opposite polarity terminal of the auxiliary winding of the transformer, and a cathode of the second diode is configured to generate a direct current (DC) system voltage to the control chip.

In one exemplary embodiment of the present invention, the voltage-current detection auxiliary circuit includes a third diode, a second resistor, a thermistor, a third resistor and a fourth diode. A cathode of the third diode is coupled to the opposite polarity terminal of the auxiliary winding of the transformer. A first terminal of the second resistor is coupled to an anode of the third diode, and a second terminal of the second resistor is coupled to the multi-function detection pin. A first terminal of the thermistor is coupled to the multi-function detection pin. A first terminal of the third resistor is coupled to a second terminal of the thermistor, and a second terminal of the third resistor is coupled to the dangerous ground. An anode of the fourth diode is coupled to the opposite polarity terminal of the auxiliary winding of the transformer. A first terminal of the fourth resistor is coupled to an anode of the fourth diode, and a second terminal of the fourth resistor is coupled to the multi-function detection pin.

In one exemplary embodiment of the present invention, the control chip includes a control main body, a first detection switch, a second detection switch, a current detection circuit, an over temperature protection (OTP) unit and an over voltage protection (OVP) unit. The control main body is configured to be an operation core of the control chip and generate the pulse width modulation (PWM) signal in response to the power supply requirement. A first terminal of the first detection switch is coupled to the multi-function detection pin, and a control terminal of the first detection circuit is configured to receive a first control signal from the control main body. The first detection switch is turned on in response to the first control signal in the first detection phase. A first terminal of the second detection switch is coupled to the multi-function detection pin, and a control terminal of the second detection circuit is configured to receive a second control signal from the control main body. The second detection switch is turned on in response to the second control signal in the second detection in the second detection phase.

The current detection circuit is coupled between a second terminal of the first detection switch and the control main body and configured to execute a detection of the alternating current (AC) input voltage in the first detection phase, so as to provide a first detection result related to a variation of the alternating current (AC) input voltage to the control main body. The over temperature protection (OTP) unit is coupled between a second terminal of the second detection switch and the control main body, and configured to execute a detection of the over temperature protection in a first sub-phase of the second detection phase, so as to provide a second detection result to the control main body. Further, the control main body determines whether to activate an over temperature protection mechanism in response to the second detection result. The over voltage protection (OVP) unit is coupled between the second terminal of the second detection switch and the control main body, and configured to execute a detection of the over voltage protection in a second sub-phase of the second detection phase, so as to provide a third detection result to the control main body. Further, the control main body determines whether to activate an over voltage protection mechanism in response to the third detection result.

In one exemplary embodiment of the present invention, the control chip further determines whether to compensate an over current protection point which activates an over current protection mechanism in response to the first detection result.

Another exemplary embodiment of the present invention provides a power conversion method. The power conversion method includes: providing the flyback power conversion circuit, and making the flyback power conversion circuit converts an alternating current (AC) input voltage to generate a direct current (DC) output voltage in response to a pulse width modulation (PWM) signal; providing a control chip, and making the control chip to generate the pulse width modulation (PWM) signal in order to control an operation of the flyback power conversion circuit in response to a power supply requirement; and providing a voltage-current detection auxiliary circuit coupled to the flyback power conversion circuit and a multi-function detection pin of the control chip, making the voltage-current detection auxiliary circuit to assist the control chip so as to execute a detection of the AC input voltage through the multi-function detection pin in a first detection phase, and making the voltage-current detection auxiliary circuit to assist the control chip so as to execute detections of an over temperature protection and an over voltage protection through the multi-function detection pin in a second detection phase.

In one exemplary embodiment of the present invention, the power conversion method further includes making the control chip to determine whether to compensate an over current protection point which activates an over current protection mechanism in response to a first detection result of the alternating current (AC) input voltage.

In one exemplary embodiment of the present invention, the power conversion method further includes making the control chip to determine whether to activate an over temperature protection mechanism in response to a second detection result of the detection of the over temperature protection.

In one exemplary embodiment of the present invention, the power conversion method further includes making the control chip to determine whether to activate an over voltage protection mechanism in response to a third detection result of the detection of the over voltage protection.

Based on the above description, by switching the first and the second detection switch disposed in the control chip and coupled to a multi-function detection pin of the control chip at different timings, the present invention applies a collocation of the voltage-current detection auxiliary circuit and the current detection circuit at a certain timing to execute the detection of the receiving alternating current (AC) input voltage, and the present invention applies a collocation of the voltage-current detection auxiliary circuit, the over temperature protection unit and the over voltage protection unit at another timing to execute the detections of the over temperature protection and the over voltage protection. As the result, a single multi-function detection pin of the control pin is corresponding to a plurality of related function detections, so as to reduce the production cost of manufacturing the control chip.

However, the above descriptions and the below embodiments are only used for explanation and examples, and the descriptions and the embodiments do not limit the scope of the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
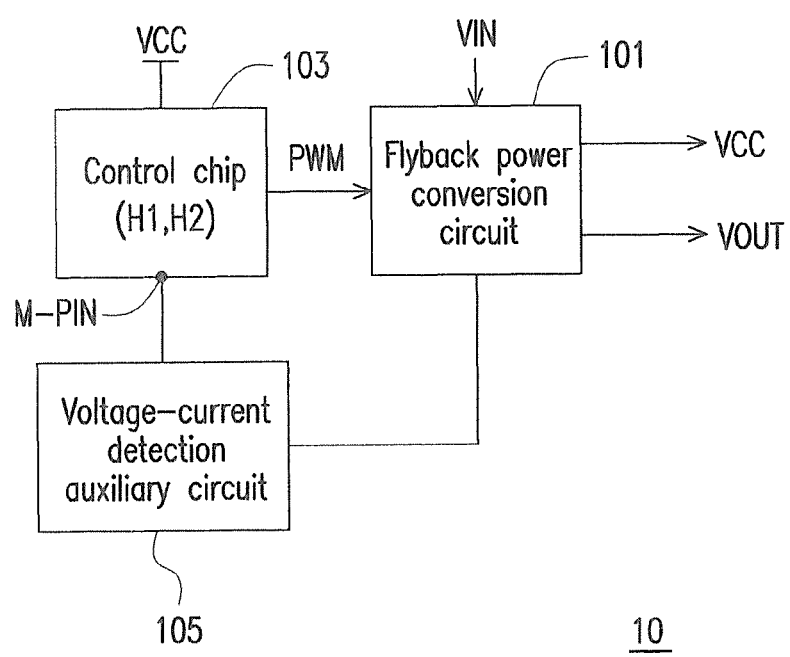
FIG. 1 is a schematic diagram illustrating a power conversion apparatus 10 in an exemplary embodiment of the present invention.

Descriptions of the invention are given with reference to the exemplary embodiments illustrated with accompanied drawings, wherein same or similar parts are denoted with same reference numerals. In addition, whenever possible, identical or similar reference numbers stand for identical or similar elements in the figures and the embodiments.

FIG. 1 is a schematic diagram illustrating a power conversion apparatus 10 in an exemplary embodiment of the present invention. Referring to FIG. 1, the power conversion apparatus 10 is flyback-based. Therefore, the power conversion apparatus 10 includes a flyback power conversion circuit 101, a control chip 103 and a voltage-current detection auxiliary circuit 105.

In the present exemplary embodiment, the flyback power conversion circuit 101 is configured to receive an alternating current (AC) input voltage VIN, and the flyback power conversion circuit 101 converts the alternating current (AC) input voltage VIN (i.e. AC/DC conversion) to generate a direct current (DC) output voltage VOUT and a direct current (DC) system voltage VCC in response to a pulse width modulation (PWM) signal from the control chip 103.

The control chip 103 is coupled to the flyback power conversion circuit 101 and operated under the DC system voltage VCC generated by the flyback power conversion circuit 101, and is configured to generate the pulse width modulation (PWM) signal so as to control an operation of the flyback power conversion circuit 101 in response to a power supply requirement of a load (e.g. an electronic device).

The voltage-current detection auxiliary circuit 105 is coupled to the flyback power conversion circuit 101 and a multi-function detection pin M-PIN of the control chip 103, configured to assist the control chip 103 for executing a detection of the AC input voltage VIN through the multi-function pin M-PIN in a first detection phase H1, and configured to assist the control chip 103 for executing detections of an over temperature protection (OTP) and an over voltage protection (OVP) through the multi-function detection pin M-PIN in a second detection phase H2.

Figure 2:
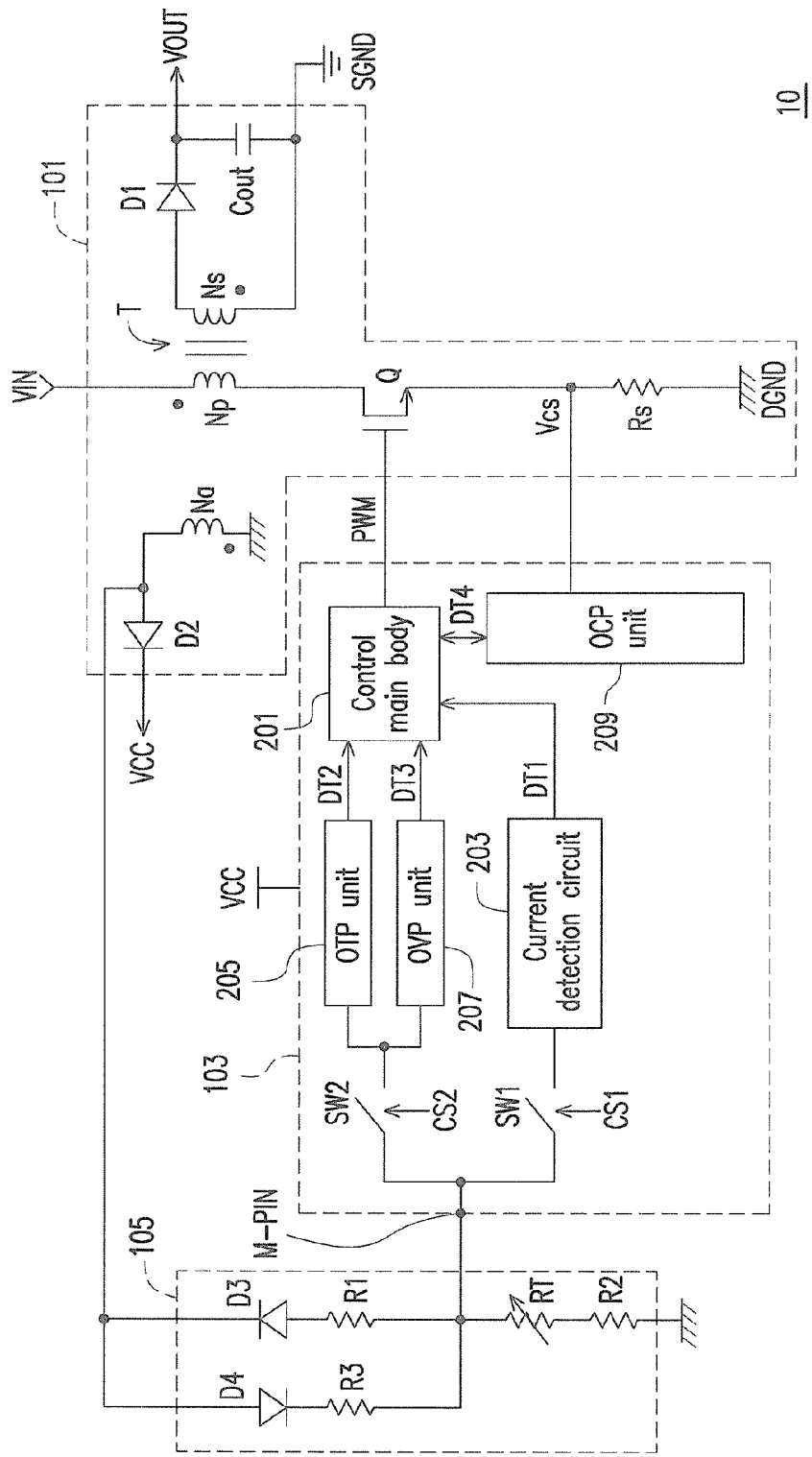
FIG. 2 is a schematic circuitry diagram illustrating a power conversion apparatus 10 in an exemplary embodiment of the present invention.

To be more specific, FIG. 2 is a schematic circuitry diagram illustrates a power conversion apparatus 10 in an exemplary embodiment of the present invention. Referring to FIG. 1 and FIG. 2 together, the flyback power conversion circuit 101 includes a transformer T, a power switch Q (e.g. an N-type power switch, so the power switch Q is referred to the N-type power switch Q), a resistor Rs, diodes D1 and D2 and a capacitor Cout.

The transformer T has a primary winding Np, a secondary winding Ns and an auxiliary winding Na. A common polarity terminal (i.e. the dotted terminal) of the primary winding Np in the transformer T is configured to receive the AC input voltage VIN, a common polarity terminal of the secondary winding Ns in the transformer T is coupled to a safety ground SGND, and a common polarity terminal of the auxiliary winding Na in the transformer T is coupled to a dangerous ground DGND.

A first terminal of the N-type power switch Q is coupled to an opposite polarity terminal (i.e. the non-dotted terminal) of the primary winding Np in the transformer T, and a control terminal of the N-type power switch Q is configured to receive the pulse width modulation (PWM) signal PWM from the control chip 103. A first terminal of the resistor Rs is coupled to a second terminal of the N-type power switch Q so as to provide an over current protection (OCP) detection voltage Vcs to the control chip 103, and a second terminal of the resistor Rs is coupled to the dangerous ground DGND.

An anode of the diode D1 is coupled to an opposite polarity terminal of the secondary winding Ns of the transformer T, and a cathode of the diode D1 is configured to generate the DC output voltage VOUT. A first terminal of the capacitor Cout is coupled to the cathode of the diode D1, and a second terminal of the capacitor Cout is coupled to the safety ground SGND. An anode of the diode D2 is coupled to an opposite polarity terminal of the auxiliary winding Na of the transformer T, and a cathode of the diode D2 is configured to generate the DC system voltage VCC.

In addition, the voltage-current detection auxiliary circuit 105 includes diodes D3 and D4, resistors R1-R3 and a thermistor RT. A cathode of the diode D3 is coupled to the opposite polarity terminal of the auxiliary winding Na of the transformer T. A first terminal of the resistor R1 is coupled to an anode of the diode D3, and a second terminal of the resistor R1 is coupled to the multi-function detection pin M-PIN of the control chip 103. A first terminal of the thermistor RT is coupled to the multi-function detection pin M-PIN, a second terminal of the thermistor RT is coupled to a first terminal of the resistor R2, and a second terminal of the resistor R2 is coupled to the dangerous ground DGND. An anode of the diode D4 is coupled to the opposite polarity terminal of the auxiliary winding Na of the transformer T, a first terminal of the resistor R3 is coupled to an cathode of the diode D4, and a second terminal of the resistor R3 is coupled to the multi-function detection pin M-PIN of the control chip 103. In the present exemplary embodiment, the thermistor RT has a negative temperature coefficient (NTC).

Moreover, the control chip 103 includes a control main body 201, detection switches SW1 and SW2, a current detection circuit 203, an over temperature protection unit (OTP unit) 205, an over voltage protection unit (OVP unit) 207 and an over current protection unit (OCP unit) 209. The control main body 201 is configured to be an operation core of the control chip 103 and to generate the pulse width modulation (PWM) signal PWM in response to the power supply requirement of the load.

A first terminal of the detection switch SW1 is coupled to the multi-function detection pin M-PIN of the control chip 103, and a control terminal of the detection switch SW1 is configured to receive a first control signal CS1 from the control main body 201. In the present exemplary embodiment, the detection switch SW1 is turned on in a first detection phase H1 in response to the first control signal CS1.

A first terminal of the detection switch SW2 is coupled to the multi-function detection pin M-PIN of the control chip 103, and a control terminal of the detection switch SW2 is configured to receive a second control signal CS2 from the control main body 201. In the present exemplary embodiment, the detection switch SW2 is turned on in a second detection phase H2 in response to the second control signal CS2.

The current detection circuit 203 is coupled between the second terminal of the detection switch SW1 and the control main body 201 for executing the detection of the AC input voltage VIN in the first detection phase H1 and providing a first detection result DT1 related to the variation of the AC input voltage VIN to the control main body 201. For example, a detection range of the current detection circuit 203 for detecting the current corresponding to the AC input voltage VIN can be 90 VAC~264 VAC, but not limited thereto.

Figure 3:
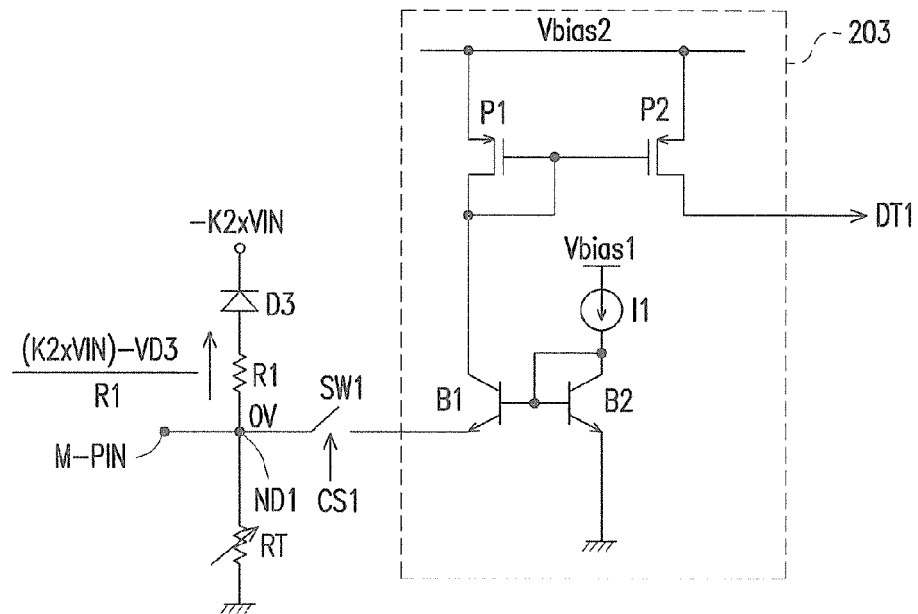
FIG. 3 is a schematic practice diagram illustrating a current detection circuit 201 in an exemplary embodiment of the present invention.

To be more specific, FIG. 3 is a schematic practice diagram illustrating a current detection circuit 203 in an exemplary embodiment of the present invention. Referring FIG. 1 to FIG. 3 together, the current detection circuit 203 includes NPN-type bipolar junction transistors (NPN-type BJTs) B1 and B2, a current source I1 and P-type metal-oxide-semiconductor field-effect transistors (PMOS transistors) P1 and P2. An emitter of the NPN-type BJT B1 is coupled to the second terminal of the detection switch SW1. A base and a collector of the NPN-type BJT B2 are coupled to a base of the NPN-type BJT B1, and an emitter of the NPN-type BJT B2 is coupled to the dangerous ground DGND.

A first terminal of the current source I1 is coupled to a bias voltage Vbias1, and a second terminal of the current source I1 is coupled to the collector of the BJT B2. A source of the PMOS transistor P1 is coupled to a bias voltage Vbias2, and a gate and a drain of the PMOS transistor P1 are coupled to the collector of the NPN-type BJT B1. A source of the PMOS transistor P2 is coupled to the bias voltage Vbias2, a gate of the PMOS transistor P2 is coupled to the gate of the PMOS transistor P1, and a drain of the PMOS transistor P2 is configured to output the first detection result DT1 related to the variation of the AC input voltage VIN.

Furthermore, the over temperature protection unit 202 is coupled between the second terminal of the detection switch SW2 and the control main body 201, and is configured to execute a detection of the over temperature protection (OTP) in a first sub-phase H2' of the second detection phase H2 for providing a second detection result DT2 to the control main body 201. In addition, the over voltage protection unit 207 is coupled between the second terminal of the detection switch SW2 and the control main body 201, and is configured to execute a detection of the over voltage protection (OVP) in a second sub-phase H2" of the second detection phase H2 for providing a third detection result DT3 to the control main body 201.

Figure 4:
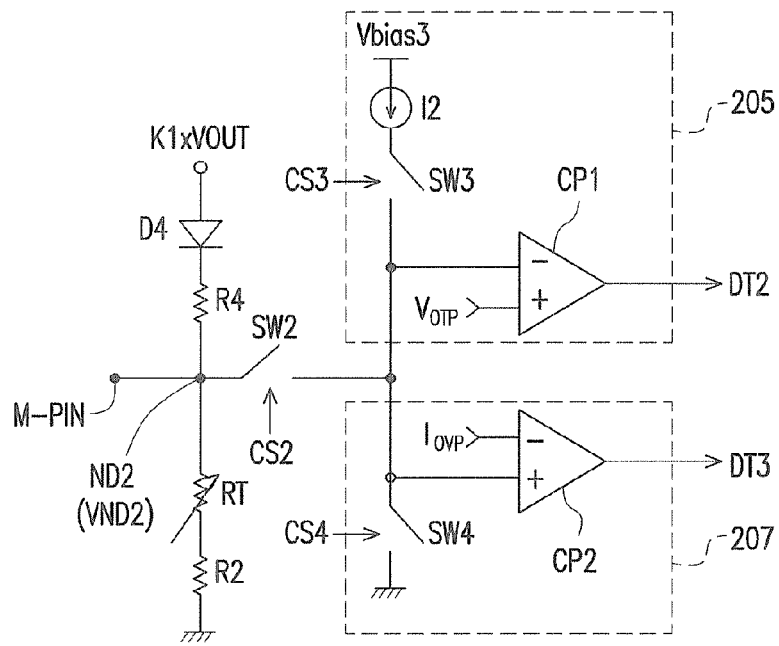
FIG. 4 is a schematic practice diagram illustrating an over temperature protection unit 205 and an over voltage protection unit 207 in an exemplary embodiment of the present invention.

More specifically, FIG. 4 is a schematic practice diagram illustrating the over temperature protection unit 205 and the over voltage protection unit 207 in an exemplary embodiment of the present invention. Referring to FIG. 1~FIG. 4 together, the over temperature protection unit 205 includes a current source I2, a switch SW3 and a comparator CP1, A first terminal of the current source I2 is coupled to a bias voltage Vbias3, and a second terminal of the current source I2 is coupled to a first terminal of the switch SW3. A second terminal of the switch SW3 is coupled to the second terminal of the detection switch SW2, and a control terminal of the switch SW3 is configured to receive a third control signal CS3 from the control main body 201. In the present exemplary embodiment, the switch SW3 is turned on in the first sub-phase H2' of the second detection phase H2 in response to the third control signal CS3. A positive input terminal of the comparator CP1 is configured to receive an over temperature protection (OTP) reference voltage $V_{OTP}$, a negative input terminal of the comparator CP1 is coupled to the second terminal of the detection switch SW2 and an output terminal of the comparator CP1 is configured to output the second detection result DT2.

In the present exemplary embodiment, the control main body 201 determines whether to activate an over temperature protection mechanism in response to the second detection result DT2 provided by the over temperature protection unit 205 Once the control main body 201 determines to activate the over temperature protection mechanism in response to the second detection result DT2 provided by the over temperature protection unit 205, the control main body 201 stops outputting the pulse width modulation (PWM) signal PWM until the control main body 201 determines to inactivate the over temperature protection mechanism in response to the second detection result DT2 provided by the over temperature protection unit 205 (i.e. no occurrence of the over temperature).

Also, the over voltage protection unit 207 includes a switch SW4 and a comparator CP2. A first terminal of the switch SW4 is coupled to the second terminal of the detection switch SW2, and a control terminal of the switch SW4 is configured to receive a fourth control signal CS4 from the control main body 201. In the present exemplary embodiment, the switch SW4 is turned on in the second sub-phase H2" of the second detection phase H2 in response to the fourth control signal CS4. A positive input terminal of the comparator CP2 is coupled to the second terminal of the detection switch SW2, a negative input terminal of the comparator CP2 is configured to receive an over voltage protection (OVP) reference current $I_{OVP}$ and an output terminal of the comparator CP2 is configured to output a third detection result DT3.

In the present exemplary embodiment, the control main body 201 determines whether to activate an over voltage protection mechanism in response to the third detection result DT3 provided by the over voltage protection unit 207. Once the control main body 201 determines to activate the over voltage protection mechanism in response to the third detection result DT3 provided by the over voltage protection unit 207, the control main body 201 stops outputting the pulse width modulation (PWM) signal PWM until the control main body 201 determines to inactivate the over voltage protection mechanism in response to the third detection result DT3 provided by the over voltage protection unit 207 (i.e. no occurrence of the over voltage).

Further, the over current protection unit 209 is coupled to the control main body 201, and is configured to execute the detection of the over current protection (OCP) in response to an over current protection detection voltage Vcs across the resistor Rs during an operation of the power conversion apparatus 10 and to provide a fourth detection result DT4 to the control main body 201. In the present exemplary embodiment, the control main body 201 determines whether to activate an over current protection mechanism in response to the fourth detection result DT4 provided by the over current protection unit 209. Once the control main body 201 determines to activate the over current protection mechanism in response to the fourth detection result DT4 provided by the over current protection unit 209, the control main body 201 stops outputting the pulse width modulation (PWM) signal PWM until the control main body 201 determines to inactivate the over voltage protection mechanism in response to the fourth detection result DT4 provided by the over current protection unit 209 (i.e. no occurrence of the over current).

Moreover, each of the over current protection points (OCP point) of the over current protection mechanism corresponding to different AC input voltages VIN in the range of 90 VAC~264 VAC is not identical to other over current protection points. Therefore, in the present exemplary embodiment, the control main body 201 further determines whether to compensate the over current protection point which activates the over current protection mechanism in response to the first detection result DT1 related to the variation of the AC input voltage VIN provided by the current detection circuit 203.

In detail, when the AC input voltage VIN is a relative high AC input voltage, such as the AC input voltage which is 264 VAC, the over current protection point compensated by the control main body 201 is a first over current protection point. Further, when the AC input voltage VIN is a relative low AC input voltage, such as the AC input voltage is 90 VAC, the over current protection point compensated by the control main body 201 is a second over current protection point. It should be noted that the first over current protection point and the second over current protection point are different. As the result, the over current protection mechanism is modulated by the over current protection unit 209 which is adapting to various AC input voltages VIN, so as to reach all the over current protection points precisely corresponding to the range of 90 VAC~264 VAC.

Based on the above description, under a normal operation of the power apparatus 10, the control chip 103 generates the pulse width modulation (PWM) signal PWM to control the operation of the flyback power conversion circuit 101 in response to a power supply requirement of the load (e.g. electronic devices). Under such condition, when the N-type power switch Q is turned on in response to the pulse width modulation (PWM) signal PWM generated by the control chip 103, the AC input voltage VIN is coupled across the primary winding Np of the transformer T, and an induced current of the primary winding Np of the transformer T is linearly increased for storing energy. At the same time, the secondary winding Ns of the transformer T has no current pass by due to the block of a reverse bias of the diode D1. In addition, the auxiliary winding Na of the transformer T has no current pass by as well.

On the other hand, when the N-type power switch Q is turned off in response to the pulse width modulation (PWM) signal PWM generated by the control chip 103, based on the Lenz's law, the energy stored in the primary winding Np of the transformer T is transferred to the secondary winding Ns and the auxiliary winding Na of the transformer T. At the same time, since the diode D1 is forward-biased and turned on, the capacitor Cout is charged by the energy transferred to the secondary winding Ns of the transformer T, so as to provide the DC output voltage VOUT to the load (electronic devices). Also, the DC system voltage VCC converted from the energy transferred to the auxiliary winding Na of the transformer T is provided to the control chip 103 through the diode D2.

Therefore, based on an operation method such that the N-type power switch Q is alternatively turned on and turned off according to the pulse width modulation (PWM) signal generated by the control chip 103, the power conversion apparatus 10 can continuously provide the DC output voltage VOUT and the DC system voltage VCC.

Figure 5A:
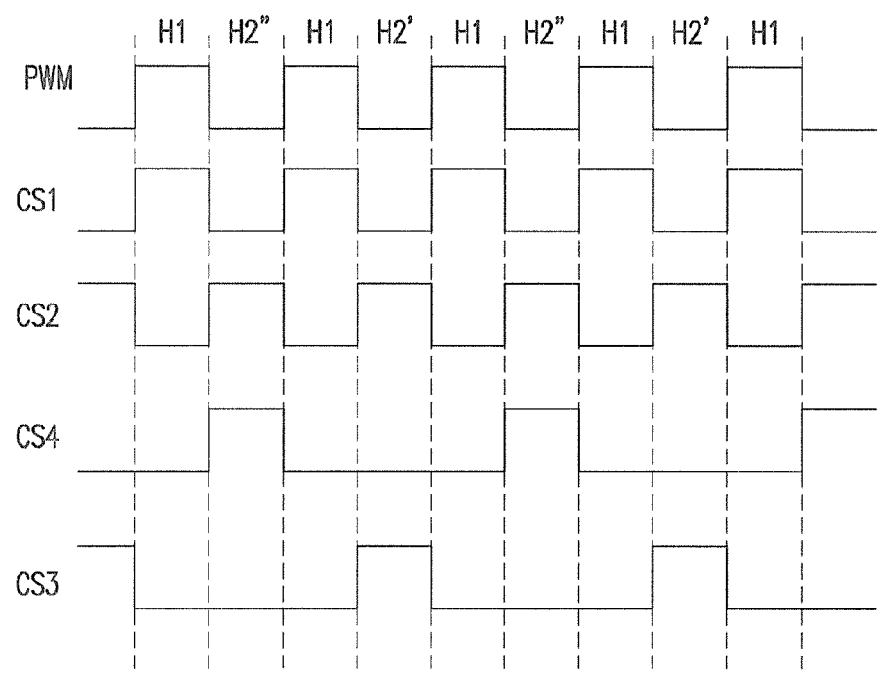
FIG. 5A is a schematic diagram of controlling switches in an exemplary embodiment of the present invention.

From another aspect, as the power conversion apparatus is in normal operation, when the N-type power switch Q is turned on in response to the pulse width modulation (PWM) signal PWM generated by the control chip 103 (i.e. the pulse width modulation signal PWM is enabled, referring to FIG. 5A), the control chip 103 enters the aforementioned first detection phase H1. Under such condition, the detection switches SW1 and SW2 are respectively turned on and turned off in response to the turn on state of the N-type power switch Q (since the control signal CS1 is enabled, and the control signal CS2 is disabled), so the voltage of the auxiliary winding Na of the transformer T is (−K2*VIN), wherein K2 is a turns ratio of the auxiliary winding Na and the primary winding Np (Na/Np). Meanwhile, the current ([(K2*VIN)−VD3]/R1) provided by the current source I1 flows through the resistor R1 and the diode D3, where the VD3 is the forward voltage of the diode D3.

When the voltage of a node ND1 is fixed, the current flows through the diode D3 and the resistor R1 is positively proportional to (−K2*VIN). In other words, when the AC input voltage is getting higher and higher, the current flows through the diode D3 and the resistor R1 is getting higher and higher as well. On the contrary, when the AC input voltage is getting lower and lower, the current flows through the diode D3 and resistor R1 is getting lower and lower as well. As the result, the current detection result proportional to the AC input voltage is obtained by the current detection circuit 203 as the first detection result DT1.

Once the first detection result DT1 from the current detection circuit 203 is received by the control main body 201, the control main body 201 acknowledges the amount of the AC input voltage VIN received by the flyback power conversion circuit 101, so as to determine the amount of the compensation to the over current protection point of the over current protection mechanism. Therefore, the over current protection unit 209 is possible to precisely activate the over current protection mechanism in adapting to different AC input voltage VIN values.

Base on the description mentioned above, during the operation process of the power conversion apparatus 10, the over current protection unit 209 executes the detection of the over current protection (OCP) in continuously response to the over current protection detection voltage Vcs across the resistor Rs, and provides the fourth detection result DT4 to the control main body 201. Once the control main body 201 determines to activate the over current protection mechanism in response to the fourth detection result DT4 provided by the over current protection unit 209, the control main body 201 stops outputting the pulse width modulation (PWM) signal PWM to protect the power conversion apparatus 10 from being damaged due to the over current condition until the control main body 201 determines to inactivate the over current protection mechanism in response to the fourth detection result DT4 provided by the over current protection unit 209 (i.e. i.e. no occurrence of the over current).

From another aspect, as the power conversion apparatus 10 is in normal operation, when the N-type power switch Q is turned off in response to the pulse width modulation (PWM) signal PWM generated by the control chip 103 (i.e. the pulse width modulation signal PWM is disabled, referring to FIG. 5A), the control chip 103 enters the aforementioned second detection phase H2. Under such condition, the detection switches SW1 and SW2 are respectively turned off and turned on in response to the turn off state of the N-type power switch Q (since the control signal CS1 is disabled, and the control signal CS2 is enabled), so the voltage of the auxiliary winding Na of the transformer T is (K1*VOUT), wherein K1 is a turns ratio of the auxiliary winding Na and the secondary winding Ns (Na/Ns).

Herein, assuming the control chip 103 enters the aforementioned second sub-phase H2" of the second detection phase H2, the control signal CS3 is disabled and the control signal CS4 is enabled. Under such condition, when the current flows through the switch SW4 which is in response to the voltage (K1*VOUT) of the auxiliary winding Na of the transformer T across the diode D4, resistor R4 and the switch SW4 is smaller than the over voltage protection reference current $I_{OVP}$, that means the condition of over voltage is not occurred in the power conversion apparatus 10. Therefore, the over voltage protection unit 207 provides the third detection result DT3 (logic"0") to the control main body 201.

However, when the current flows through the switch SW4 which is in response to the voltage (K1*VOUT) of the auxiliary winding Na of the transformer T across the diode D4, resistor R4 and the switch SW4 is larger than the over voltage protection reference current IOVP, that means the condition of over voltage is occurred in the power conversion apparatus 10. Therefore, the over voltage protection unit 207 provides the third detection result DT3 (logic"1") to the control main body 201. Once the control main body 201 determines to activate the over voltage protection mechanism in response to the third detection result DT3 (logic"1") provided by the over current protection unit 207, the control main body 201 stops outputting the pulse width modulation (PWM) signal PWM to protect the power conversion apparatus 10 from being damaged due to the over voltage condition until the control main body 201 determines to inactivate the over voltage protection mechanism in response to the third detection result DT3 (logic"0") provided by the over voltage protection unit 207 (i.e. no occurrence of the over voltage).

On the other hand, assuming the control chip 103 enters the aforementioned first sub-phase H2' of the second detection phase H2, the control signal CS3 is enabled and the control signal CS4 is disabled. Under such condition, the current provided by the current source I2 flows through the thermistor RT in order to generate corresponding voltage VND2 at a node ND2. When the resistance of the thermistor RT is reduced due to the increase of the operation temperature of the power conversion apparatus 10, the voltage VND2 at the mode ND2 is also decreased as well.

Once the voltage VND2 of the node ND2 is lower than the over temperature protection reference voltage $V_{OTP}$, that means the condition of the over temperature is occurred in the power conversion apparatus 10. Therefore, the over temperature protection unit 205 provides the second detection result DT2 (logic"1") to the control main body 201. Once the control main body 201 determines to activate the over temperature protection mechanism in response to the second detection result DT2 (logic"1") provided by the over current protection unit 205, the control main body 201 stops outputting the pulse width modulation (PWM) signal PWM to protect the power conversion apparatus 10 from being damaged due to the over temperature condition until the control main body 201 determines to inactivate the over temperature protection mechanism in response to the second detection result DT2 (logic"0") provided by the over voltage protection unit 205 (i.e. no occurrence of the over temperature).

Obviously, when each time the pulse width modulation (PWM) signal PWM is enabled, the control chip 103 enters the aforementioned first detection phase H1. In addition, the control chip 103 enters the second sub-phase H2" of the second detection phase H2 in the previous one of disabling of the pulse width modulation (PWM) signal PWM, and the control chip 103 enters the first sub-phase H2' of the second detection phase H2 in the next one of disabling of the pulse width modulation (PWM) signal PWM. In other words, as shown in FIG. 5A, periods of the control signals CS1 and CS2 are identical, and periods of the control signals CS3 and CS4 are two times of the periods of control signals CS1 and CS2. Nevertheless, the present invention should not be construed as limited to the embodiments set forth herein.

To be more specific, in order to obtain a precise estimation of the influence to the voltage detection caused by the environment temperature, the variant ingredient (K1*VOUT) in the previous exemplary embodiment should be eliminated. Since the variant ingredient (K1*VOUT) is increased in regarding to the variation of the DC output voltage Vout, the variant ingredient (K1*VOUT) will affect the precision of the result of detecting the voltage VND2 related to the temperature at the node ND2.

Figure 5B:
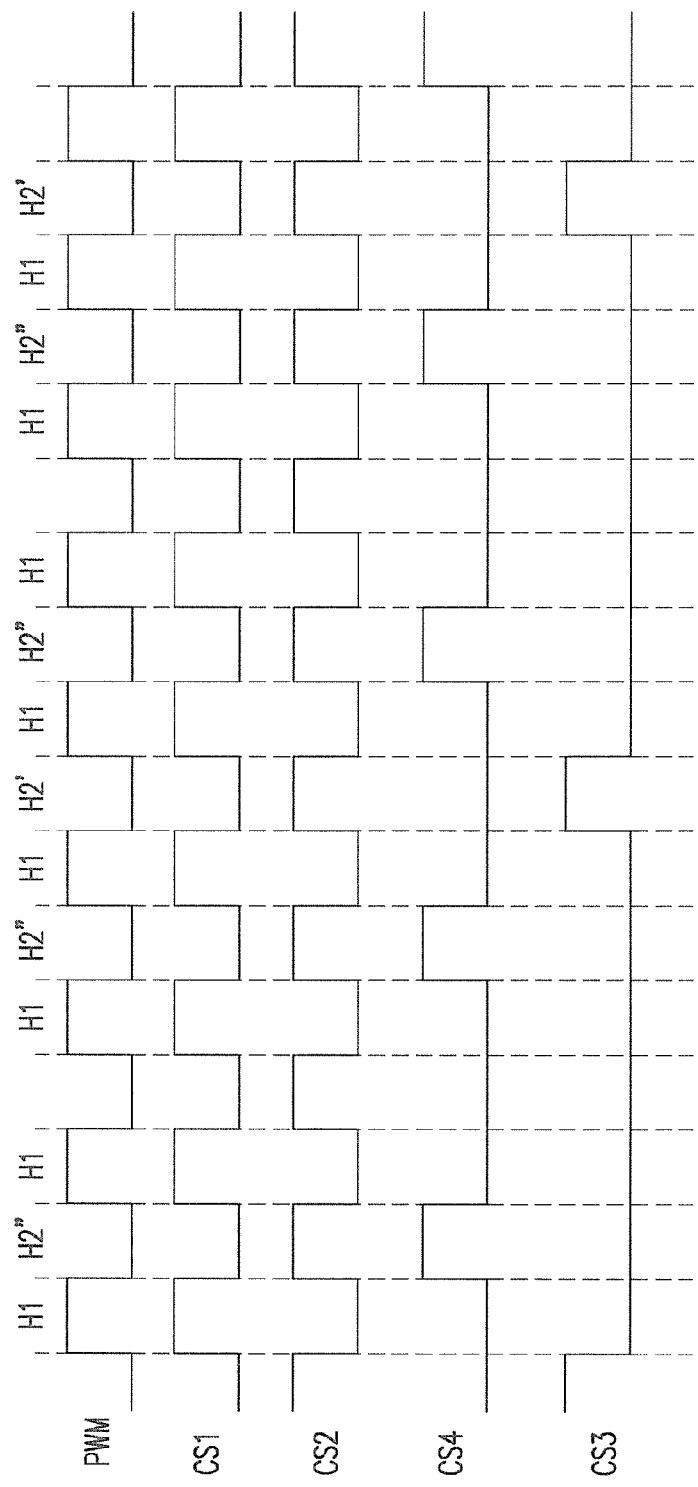
FIG. 5B is a schematic diagram of controlling switches in another exemplary embodiment of the present invention.

Therefore, referring to FIG. 5B, the relationship between the AC input voltage VIN and the detection mechanism/method of the over voltage protection is similar to the previous exemplary embodiment, so a detailed description is omitted herein. Accordingly, only points of the over voltage protection mechanism/method which are different to the over temperature protection mechanism/method are described below. In other words, according to the present exemplary embodiment, as shown in FIG. 5B, periods of control signals CS1 and CS2 are identical. A period of control signals CS3 is four times of the periods of control signals CS1 and CS2, and a period of signal CS4 are two times of the periods of control signals CS1 and CS2.

Based on the previous description, as shown in FIG. 5B, the control chip 103 enters the first detection phase H1 each time the pulse width modulation (PWM) signal PWM is enabled. In addition, the control chip 103 enters the second sub-phase H2" of the second detection phase H2 in the previous one of disabling of the pulse width modulation (PWM) signal PWM, and the control chip 103 enters the first sub-phase H2' of the second detection phase H2 in the next three times of disabling of the pulse width modulation (PWM) signal PWM.

To be more specific, assuming the control chip 103 enters the aforementioned first detection phase H1, the control signal CS1 is enabled and the control signal CS2 is disabled. Under such condition, the control chip 103 executes the detection of the AC input voltage VIN. In addition, assuming the control chip 103 enters the aforementioned second sub-phase H2" of the second detection phase H2, the control signal CS3 is disabled, and the control signal CS4 is enabled. Under such condition, the control chip 103 executes the detection of the over voltage protection.

However, in the present exemplary embodiment, after the control chip 103 enters the second sub-phase H2" of the second detection phase H2, the control chip 103 does not enter the first sub-phase H2' of the second detection phase H2 in the next one of disabling of the pulse width modulation (PWM) signal PWM as like as in the last exemplary embodiment. Therefore, the switch SW3 is turned off in response to the control signal which is disabled, so the voltage VND2 at the node ND2 is only related to the K1*VOUT. The voltage VND2 related to the K1*VOUT at the node ND2 is defined as VPT1.

Next, when the pulse width modulation (PWM) signal PWM is disabled again, the control chip 103 enters the aforementioned second sub-phase H2" of the second detection phase H2 so as to execute the detection of the over voltage protection again. Thereafter, when the pulse width modulation (PWM) signal is disabled again, the control chip 103 enters the aforementioned first sub-phase H2' of the second detection phase H2. As the result, the switch SW3 is turned on in response to the control signal CS3 which is enabled, so the voltage VND2 at the node ND2 is related to the K1*VOUT and the voltage (i.e. I2*(RT+R2)) defined by the current source I2, thermistor RT and resistor R2. Herein, the voltage VND2 related to K1*VOUT and I2*(RT+R2) at the node ND2 is defined as VPT2.

Based on the above description, when the control chip 103 enters the aforementioned first sub-phase H2' of the second detection phase H2, the control chip 103 temporarily store the VPT1, the VPT2 and the (VPT2−VPT1) to obtain the result of the influence to the voltage detection caused by the environment temperature. In other words, the accuracy of the voltage VND2 related to the temperature at node ND2 is not affected by the K1*VOUT in order to avoid activating the mechanism of the over temperature protection incorrectly.

Figure 6:
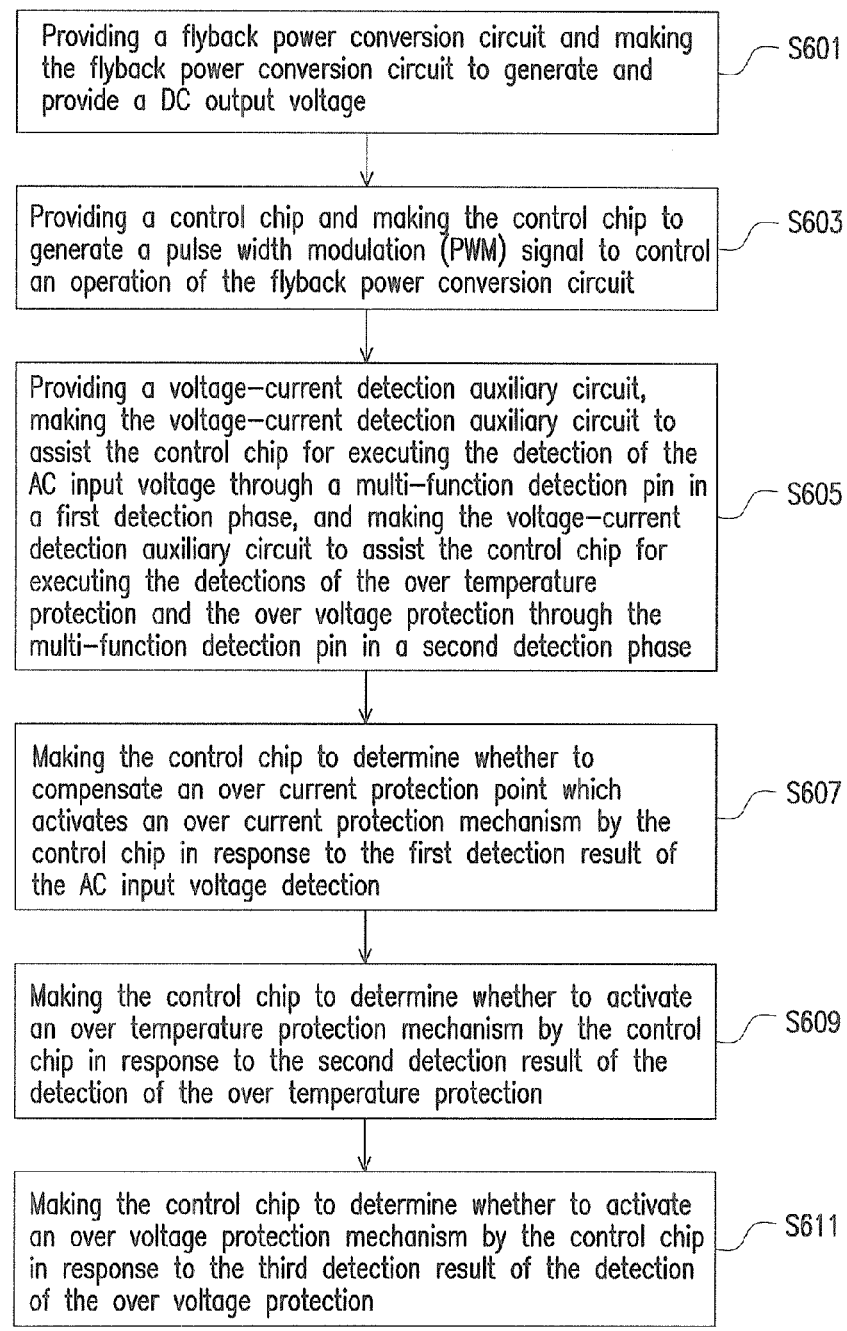
FIG. 6 is a flow chart illustrating a power conversion method according to an exemplary embodiment of the present invention.

Based on the disclosure of the aforesaid exemplary embodiments, FIG. 6 is a flow chart illustrating the power conversion method according to an exemplary embodiment of the present invention. Referring to FIG. 6, the power conversion method of the present exemplary embodiment includes the following steps.

Providing the flyback power conversion circuit and making the flyback power conversion circuit to convert the AC input voltage in response to the pulse width modulation (PWM) signal so as to generate and provide a DC output voltage (step S601).

Providing the control chip and making the control chip to generate the pulse width modulation (PWM) signal in response to the power supply requirement of a load in order to control the operation of the flyback power conversion circuit (step S603).

Providing the voltage-current detection auxiliary circuit coupled to the flyback power conversion circuit and the multi-function detection pin of the control chip, making the voltage-current detection auxiliary circuit to assist the control chip for executing the detection of the AC input voltage through the multi-function detection pin in the first detection phase, and making the voltage-current detection auxiliary circuit to assist the control chip for executing the detections of the over temperature protection and the over voltage protection through the multi-function detection pin in the second detection phase (step S605).

Making the control chip to determine whether to compensate the over current protection point which activates the over current protection mechanism by the control chip in response to the first detection result of the AC input voltage detection (step S607).

Making the control chip to determine whether to activate the over temperature protection mechanism by the control chip in response to the second detection result of the over temperature protection detection (step S609).

Making the control chip to determine whether to activate the over voltage protection mechanism by the control chip in response to the third detection result of the over voltage protection detection (step S611).

Similarly, in determining whether to activate the over current protection mechanism, the over voltage protection mechanism or the over temperature protection mechanism, the control chip stops outputting the pulse modulation signal until over current, over voltage and/or over temperature are absent.

Based on the above description, by switching first and second detection switches disposed in the control chip and coupled to a multi-function pin of the control chip at different timings, the present invention applies a collocation of the voltage-current detection auxiliary circuit and the current detection circuit at a certain timing to execute the detection of the received AC input voltage, and the present invention applies a collocation of the voltage-current detection auxiliary circuit, the over temperature protection unit and the over voltage protection unit at another timing to execute the detections of the over temperature protection and the over voltage protection. As the result, a single multi-function detection pin of the control pin is corresponding to a plurality of related function detections, so as to reduce the production cost of manufacturing the control chip.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions. Any of the embodiments or any of the claims of the invention does not need to achieve all of the advantages or features disclosed by the present invention. Moreover, the abstract and the headings are merely used to aid in searches of patent files and are not intended to limit the scope of the claims of the present invention.

What is claimed is:

1. A power conversion apparatus, comprising:
    a flyback power conversion circuit, configured to receive an alternating current (AC) input voltage, and convert the AC input voltage in response to a pulse width modulation (PWM) signal, so as to generate and provide a direct current (DC) output voltage, wherein the flyback power conversion circuit comprises:
        a transformer, comprising a primary winding, a secondary winding and an auxiliary winding, wherein a common polarity terminal of the primary winding of the transformer is configured to receive the AC input voltage, a common polarity terminal of the secondary winding of the transformer is coupled to a safety ground, and a common polarity terminal of the auxiliary winding of the transformer is coupled to a dangerous ground;
        a power switch, wherein a first terminal of the power switch is coupled to an opposite polarity terminal of the primary winding, and a control terminal of the power switch is configured to receive the PWM signal;
        a first resistor, wherein a first terminal of the first resistor is coupled to a second terminal of the power switch, and a second terminal of the first resistor is coupled to the dangerous ground;
        a first diode, wherein an anode of the first diode is coupled to an opposite polarity terminal of the secondary winding, and a cathode of the first diode is configured to generate the DC output voltage;
        a capacitor, wherein a first terminal of the capacitor is coupled to the cathode of the first diode, and a second terminal of the capacitor is coupled to the safety ground; and
        a second diode, wherein an anode of the second diode is coupled to an opposite polarity terminal of the auxiliary winding;
    a control chip, coupled to the flyback power conversion circuit, and configured to generate the PWM signal in response to a power supply requirement so as to control an operation of the flyback power conversion circuit, wherein the first terminal of the first resistor provides an over current protection detection voltage to the control chip, and a cathode of the second diode is configured to generate a DC system voltage for the control chip; and
    a voltage-current detection auxiliary circuit, coupled between the flyback power conversion circuit and a multi-function detection pin of the control chip, configured to assist the control chip in executing a detection of the AC input voltage through the multi-function detection pin in a first detection phase, and configured to assist the control chip in executing detections of an over temperature protection and an over voltage protection through the multi-function pin in a second detection phase, wherein the voltage-current detection auxiliary circuit comprises:
        a third diode, wherein a cathode of the third diode is coupled to the opposite polarity terminal of the auxiliary winding;
        a second resistor, wherein a first terminal of the second resistor is coupled to an anode of the third diode, and a second terminal of the second resistor is coupled to the multi-function detection pin;
        a thermistor, wherein a first terminal of the thermistor is coupled to the multi-function detection pin;
        a third resistor, wherein a first terminal of the third resistor is coupled to a second terminal of the thermistor, and a second terminal of the third resistor is coupled to the dangerous ground;
        a fourth diode, wherein an anode of the fourth diode is coupled to the opposite polarity terminal of the auxiliary winding; and
        a fourth resistor, wherein a first terminal of the fourth resistor is coupled to a cathode of the fourth diode, and a second terminal of the fourth resistor is coupled to the multi-function detection pin.

2. The power conversion apparatus as claimed in claim 1, wherein the thermistor has a negative temperature coefficient (NTC).

3. The power conversion apparatus as claimed in claim 1, wherein the control chip comprises:
    a control main body, configured to be an operation core of the control chip, and configured to generate the PWM signal in response to the power supply requirement;
    a first detection switch, wherein a first terminal of the first detection switch is coupled to the multi-function detection pin, and a control terminal of the first detection switch is configured to receive a first control signal from the control main body, and the first detection switch is turned on in response to the first control signal in the first detection phase;

a second detection switch, wherein a first terminal of the second detection switch is coupled to the multi-function detection pin, and a control terminal of the second detection switch is configured to receive a second control signal from the control main body, and the second detection switch is turned on in response to the second control signal in the second detection phase;

a current detection circuit, coupled between a second terminal of the first detection switch and the control main body, and configured to execute the detection of the AC input voltage in the first detection phase and to provide a first detection result related to a variation of the AC input voltage to the control main body;

an over temperature protection (OTP) unit, coupled between a second terminal of the second detection switch and the control main body, and configured to execute the detection of the over temperature protection in a first sub-phase of the second detection phase and to provide a second detection result to the control main body, wherein the control main body determines whether to activate an over temperature protection mechanism in response to the second detection result; and an over voltage protection (OVP) unit, coupled between the second terminal of the second detection switch and the control main body, and configured to execute the detection of the over voltage protection in a second sub-phase of the second detection phase and to provide a third detection result to the control main body, wherein the control main body determines whether to activate an over voltage protection mechanism in response to the third detection result.

4. The power conversion apparatus as claimed in claim 3, wherein the control chip further comprises:

an over current protection unit, coupled to the control main body, and configured to execute a detection of an over current protection in response to the over current protection detection voltage during an operation process of the power conversion apparatus and to provide a fourth detection result to the control main body, wherein the control main body determines whether to activate an over current protection mechanism in response to the fourth detection result, and wherein the control main body determines whether to compensate an over current protection point which activates the over current protection mechanism in response to the first detection result.

5. The power conversion apparatus as claimed in claim 4, wherein:

when the AC input voltage is a relative high AC input voltage, the over current protection point compensated by the control main body is a first over current protection point;

when the AC input voltage is a relative low AC input voltage, the over current protection point compensated by the control main body is a second over current protection point; and the first over current protection point and the second over current protection point are different.

6. The power conversion apparatus as claimed in claim 4, wherein when the control main body determines to activate the over current protection mechanism in response to the fourth detection result, the control main body stops outputting the PWM signal until the control main body dete nines to inactivate the over current protection mechanism in response to the fourth detection result.

7. The power conversion apparatus as claimed in claim 3, wherein the current detection circuit comprises:

a first NPN-type bipolar junction transistor (BJT), wherein an emitter of the first NPN-type BJT is coupled to the second terminal of the first detection switch;

a second NPN-type bipolar junction transistor (BJT), wherein a base and a collector of the second NPN-type BJT are coupled to a base of the first NPN-type BJT, and an emitter of the second NPN-type BJT is coupled to the dangerous ground;

a current source, wherein a first terminal of the current source is coupled to a first bias voltage, and a second terminal of the current source is coupled to a collector of the second NPN-type BJT;

a first P-type metal-oxide-semiconductor field-effect (PMOS) transistor, wherein a source of the first PMOS transistor is coupled to a second bias voltage, and a gate and a drain of the first PMOS transistor is coupled to a collector of the first NPN-type BJT; and a second P-type metal-oxide-semiconductor field-effect (PMOS) transistor, wherein a source of the second PMOS transistor is coupled to the second bias voltage, a gate of the second PMOS transistor is coupled to the gate of the first PMOS transistor, and a drain of the second PMOS transistor is configured to output the first detection result related to the variation of the AC input voltage.

8. The power conversion apparatus as claimed in claim 3, wherein the over temperature protection unit comprises:

a current source, wherein a first terminal of the current source is coupled to a bias voltage;

a switch, wherein a first terminal of the switch is coupled to a second terminal of the current source, a second terminal of the switch is coupled to the second terminal of the second detection switch, and a control terminal of the switch is configured to receive a third control signal from the control main body, wherein the switch is turned on in response to the third control signal in the first sup-phase; and a comparator, wherein a positive input terminal of the comparator is configured to receive an over temperature protection reference voltage, a negative input terminal of the comparator is coupled to the second terminal of the second detection switch, and an output terminal of the comparator is configured to output the second detection result.

9. The power conversion apparatus as claimed in claim 8, wherein periods of the first control signal and the second control signal are identical, and a period of third control signal equals to two times or four times of the periods of the first control signal and the second control signal.

10. The power conversion apparatus as claimed in claim 3, wherein the over voltage protection unit comprises:

a switch, wherein a first terminal of the switch is coupled to the second terminal of the second detection switch, a second terminal of the switch is coupled to the dangerous ground, and a control terminal of the switch is configured to receive a fourth control signal from the control main body, wherein the switch is turned on at the second sub-phase in response to the fourth control signal; and a comparator, wherein a positive input terminal of the comparator is coupled to the second terminal of the second detection terminal, a negative input terminal of the comparator is configured to receive an over voltage protection reference current, and an output terminal of the comparator is configured to output the third detection result.

11. The power conversion apparatus as claimed in claim 10, wherein periods of the first control signal and the second control signal are identical, and a period of the fourth control signal equals to two times of the periods of the first control signal and the second control signal.

12. The power conversion apparatus as claimed in claim 3, wherein when the control main body determines to activate the over temperature protection mechanism in response to the second detection result, the control main body stops outputting the PWM signal until the control main body determines to inactivate the over temperature protection mechanism in response to the second detection result.

13. The power conversion apparatus as claimed in claim 3, wherein when the control main body determines to activate the over voltage protection mechanism in response to the third detection result, the control main body stops outputting the PWM signal until the control main body determines to inactivate the over voltage protection mechanism in response to the third detection result.

14. A power conversion method, comprising:
  providing a flyback power conversion circuit and making the flyback power conversion circuit to convert an alternating current (AC) input voltage in response to a pulse width modulation (PWM) signal so as to generate and provide a direct current (DC) output voltage, wherein the flyback power conversion circuit comprises:
    a transformer, comprising a primary winding, a secondary winding and an auxiliary winding, wherein a common polarity terminal of the primary winding of the transformer is configured to receive the AC input voltage, a common polarity terminal of the secondary winding of the transformer is coupled to a safety ground, and a common polarity terminal of the auxiliary winding of the transformer is coupled to a dangerous ground;
    a power switch, wherein a first terminal of the power switch is coupled to an opposite polarity terminal of the primary winding, and a control terminal of the power switch is configured to receive the PWM signal;
    a first resistor, wherein a first terminal of the first resistor is coupled to a second terminal of the power switch, and a second terminal of the first resistor is coupled to the dangerous ground;
    a first diode, wherein an anode of the first diode is coupled to an opposite polarity terminal of the secondary winding, and a cathode of the first diode is configured to generate the DC output voltage;
    a capacitor, wherein a first terminal of the capacitor is coupled to the cathode of the first diode, and a second terminal of the capacitor is coupled to the safety ground; and
    a second diode, wherein an anode of the second diode is coupled to an opposite polarity terminal of the auxiliary winding;
  providing a control chip and making the control chip to generate the PWM signal in response to a power supply requirement so as to control an operation of the flyback power conversion circuit, wherein the first terminal of the first resistor provides an over current protection detection voltage to the control chip, and a cathode of the second diode is configured to generate a DC system voltage for the control chip; and
  providing a voltage-current detection auxiliary circuit coupled between the flyback power conversion circuit and a multi-function detection pin of the control chip, making the voltage-current detection auxiliary circuit to assist the control chip in executing a detection of the AC input voltage through the multi-function detection pin in a first detection phase, and making the voltage-current detection auxiliary circuit to assist the control chip in executing detections of an over temperature protection and an over voltage protection through the multi-function detection pin in a second detection phase, wherein the voltage-current detection auxiliary circuit comprises:
    a third diode, wherein a cathode of the third diode is coupled to the opposite polarity terminal of the auxiliary winding;
    a second resistor, wherein a first terminal of the second resistor is coupled to an anode of the third diode, and a second terminal of the second resistor is coupled to the multi-function detection pin;
    a thermistor, wherein a first terminal of the thermistor is coupled to the multi-function detection pin;
    a third resistor, wherein a first terminal of the third resistor is coupled to a second terminal of the thermistor, and a second terminal of the third resistor is coupled to the dangerous ground;
    a fourth diode, wherein an anode of the fourth diode is coupled to the opposite polarity terminal of the auxiliary winding; and
    a fourth resistor, wherein a first terminal of the fourth resistor is coupled to a cathode of the fourth diode, and a second terminal of the fourth resistor is coupled to the multi-function detection pin.

15. The power conversion method as claimed in claim 14, further comprising:
  making the control chip to determine whether to compensate an over current protection point which activates an over current protection mechanism in response to a first detection result of the detection of the AC input voltage;
  making the control chip to determine whether to activate an over temperature protection mechanism in response to a second detection result of the detection of the over temperature protection; and
  making the control chip to determine whether to activate an over voltage protection mechanism in response to a third detection result of the detection of the over voltage protection.

* * * * *